United States Patent [19]

Taguchi

[11] Patent Number: 4,864,391

[45] Date of Patent: Sep. 5, 1989

[54] IMAGE PROCESSING APPARATUS FOR COLOR CORRECTING AN IMAGE WHICH CAN MONITOR THE RESULT OF THE COLOR CORRECTION

[75] Inventor: Tomishige Taguchi, Urawa, Japan

[73] Assignee: Canon Kabushiki Kaisha, Tokyo, Japan

[21] Appl. No.: 46,086

[22] Filed: May 5, 1987

[30] Foreign Application Priority Data

May 9, 1986 [JP] Japan ................ 61-104903
May 21, 1986 [JP] Japan ................ 61-116966
May 21, 1986 [JP] Japan ................ 61-114903

[51] Int. Cl.⁴ ............................................... H04N 1/46
[52] U.S. Cl. .................................... 358/80; 358/75
[58] Field of Search ........................ 358/76, 80, 75

[56] References Cited

U.S. PATENT DOCUMENTS

| | | | |
|---|---|---|---|
| 4,017,894 | 4/1977 | Akami et al. | 358/80 |
| 4,096,523 | 6/1978 | Belmares-Sarabia et al. | 358/80 |
| 4,204,223 | 5/1980 | Gast et al. | 358/80 X |
| 4,458,265 | 7/1984 | Yoshida et al. | 358/80 |
| 4,597,006 | 6/1986 | Orsburn | 358/80 X |
| 4,642,682 | 2/1987 | Orsburn et al. | 358/80 |
| 4,647,963 | 3/1987 | Johnson et al. | 358/80 |
| 4,679,074 | 7/1987 | Sugiura et al. | 358/80 |
| 4,740,833 | 4/1988 | Shiota et al. | 358/75 X |

FOREIGN PATENT DOCUMENTS

| | | | |
|---|---|---|---|
| 58-195364 | 11/1983 | Japan | 358/80 |
| 60-216352 | 10/1985 | Japan | 358/80 |
| 60-220660 | 11/1985 | Japan | 358/80 |

Primary Examiner—James J. Groody
Assistant Examiner—E. Anne Faris
Attorney, Agent, or Firm—Fitzpatrick, Cella, Harper & Scinto

[57] ABSTRACT

An image processing apparatus for color separating an image and color correcting said image comprises: means for generating a plurality of coefficient values which are used when said color correction is performed; coefficient setting means for setting said plurality of coefficient values; and control means for allowing the coefficient values set by said coefficient setting means to be displayed on a monitor.

18 Claims, 9 Drawing Sheets

IMAGE PROCESSING APPARATUS FOR COLOR CORRECTING AN IMAGE WHICH CAN MONITOR THE RESULT OF THE COLOR CORRECTION

BACKGROUND OF THE INVENTION

1. Field of the Invention

The present invention relates to an image processing apparatus which can color correct the color data of an original image and can monitor the result of the color correction.

2. Related Background Art

Figure 8:
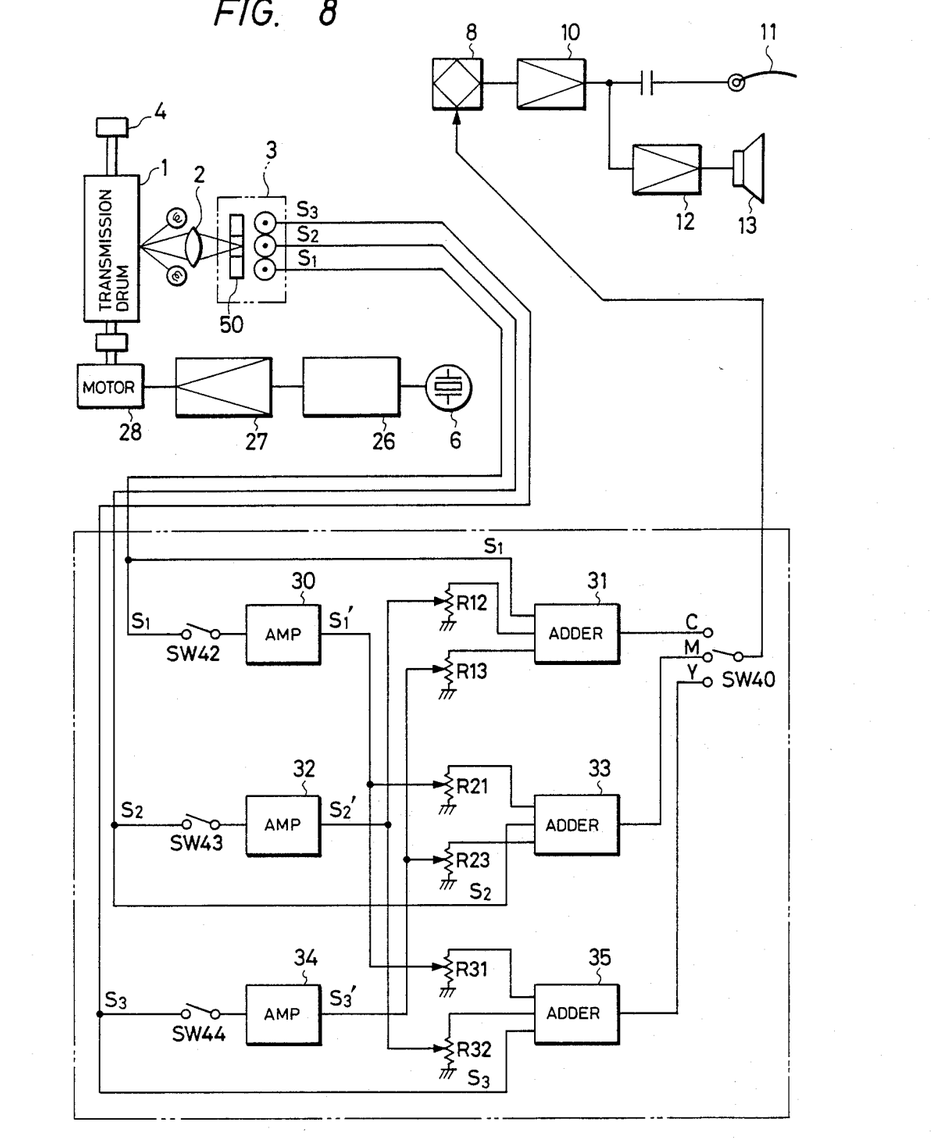
FIGS. 8 and 9 are block diagrams showing examples of color photograph transmitting apparatuses which have conventionally been known, respectively.

FIG. 8 shows an example of such a kind of apparatus which has conventionally been known. In the apparatus shown in this diagram, an original such as photograph or the like is wound around a transmission drum 1 and this drum is rotated by a motor 28. A signal which is generated from a quartz oscillator 6 is frequency divided by a frequency divider 26 and the resultant signal is supplied to a motor driving portion 27 to drive the motor 28.

Switches $SW_{42}$, $SW_{43}$ and $SW_{44}$ are closed when the masking process is executed. First, in the case of transmitting a chrominance signal of cyan print, a switch $SW_{40}$ is connected to the C side. A light source 2 and a photoelectric converting portion 3 are moved every rotation of the transmission drum 1, thereby obtaining electric signals $S_1$, $S_2$ and $S_3$ corresponding to the original image. Namely, in the photoelectric converting portion 3, the light transmitted through R, G and B color filters so enters the respective photo-sensing portions and is converted into the electric signals $S_1$, $S_2$ and $S_3$, respectively.

The electric signal $S_2$ and $S_3$ are supplied to amplifiers 32 and 34 and converted into signals $S_2'$ and $S_3'$, respectively. The levels of the signals $S_2'$ and $S_3'$ are adjusted by variable resistors $R_{12}$ and $R_{13}$ and supplied to an adder 31. The electric signal $S_1$ is also transmitted to the adder 31.

Thus, the C (cyan) signal is sent from the adder 31 and led to a modulating portion 8 through the switch $SW_{40}$. Thus, the amplitude or frequency modulated signal is amplified by an image amplifying portion 10 and output to a transmission line 11. The signal which is output to the transmission line 11 is also supplied to an amplifier 12 and amplified and supplied to a monitor speaker 13. Thus, an audible sound is generated from the speaker 13 to permit personnel thereby to monitor the transmitting state.

In the adder 31, the following operational processes are eventually performed in order to make the photoelectrically converted electric signals $S_1$ to $S_3$ adaptive to the ink characteristics for makeup on the reception side:

$$C = S_1 + C_{12} \cdot S_2' + C_{13} \cdot S_3'$$

where $C_{12}$ is a coefficient to adjust the level of the signal $S_2'$ by means of the variable resistor $R_{12}$ and $C_{13}$ is a coefficient to adjust the level of the signal $S_3'$ by means of the variable resistor $R_{13}$.

Substantially similar processes are also executed with regard to magenta print and yellow print and the resultant signals are transmitted to the transmission line 11. Namely, in an adder 33 of a masking operation circuit 36, the following operational process is executed in the case of magenta print:

$$M = C_{21} \cdot S_1' + S_2 + C_{23} \cdot S_3'$$

where, $C_{21}$ is a coefficient to adjust the level of the signal $S_1'$ by means of a variable resistor $R_{21}$ and $C_{23}$ is a coefficient to adjust the level of the signal $S_3'$ by means of a variable resistor $R_{23}$.

In the case of yellow print, the following operational process is executed:

$$Y = C_{31} \cdot S_1' + C_{32} \cdot S_2' + S_3$$

where $C_{31}$ is a coefficient to adjust the level of the signal $S_1'$ by means of a variable resistor $R_{31}$ and $C_{32}$ is a coefficient to adjust the level of the signal $S_2'$ by means of a variable resistor $R_{32}$.

Figure 9:
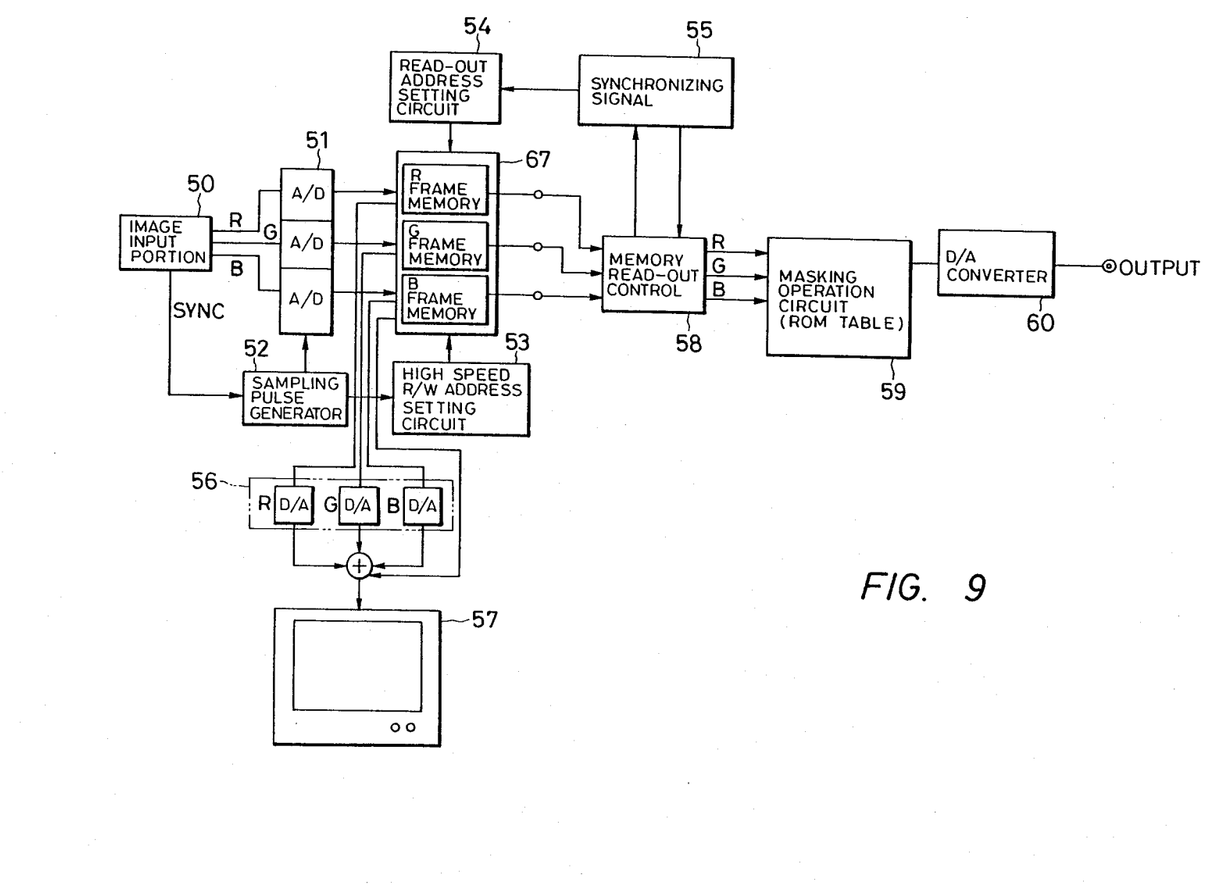

FIG. 9 is an overall constitutional diagram of another still image transmitting apparatus (color photograph transmitting apparatus) which has been conventionally known. In this apparatus, image data output from a television camera or image scanner or the like is first input to an image input portion 50 and color separated into analog chrominance signals of red (R), green (G) and blue (B). The analog signals R, G and B are digitized by an A/D converting portion 51 synchronously with a sampling signal which is generated from a sampling pulse generator 52 and stored in a frame memory 67, respectively. The content of the frame memory 67 is supplied to a D/A converter 56 under control of a high speed read/write (R/W) address setting circuit 53. The converted analog signal is supplied to a monitor 57.

On the other hand, the image data stored in the frame memory 67 is sequentially read out of the addresses designated by a read-out address setting circuit 54 synchronously with timing pulses which are generated from a transmission synchronizing signal generator 55. The read-out digital data is color corrected by a masking operation circuit 59 and input to a modulator (not shown) through a D/A converter 60. The amplitude or frequency modulated signal is transmitted to a transmission line through an amplifier (not shown). The foregoing masking processes are performed on the basis of the table reference system using the input signals R, G and B as addresses. Therefore, a table memory having a large memory capacity is provided in the masking operation circuit 59.

However, since a number of variable resistors are included in the masking operation circuit 36 in the apparatus shown in FIG. 8, there are the drawbacks that it is fairly difficult to perform adjustment to obtain desired results of the masking processes while changing the resistance values of the variable resistors, and that such a construction is improper for miniaturization. On the other hand, when the apparatus is moved, there is a possibility that the user might erroneously touch those variable resistors, requiring the user to adjust the levels again.

Further, the apparatus shown in FIG. 9 has a drawback that the masking operation circuit 59 needs a conversion ROM of a large capacity. For example, when each of the chrominance signals R, G and B has 256 gradations, if the output of the ROM consists of eight bits, a memory capacity of 256×256×3 bytes is necessary, so that this construction is improper for miniaturization. Moreover, since the mask data is written into an ordinary ROM (read only memory) or an EEPROM (electrically erasable and programmable read only memory), much labor is required to change masking constants and it is almost impossible for the general user to change those constants.

On the other hand, in the color correcting circuit as in image processing circuit in the apparatus shown in FIG. 8, a discrimination regarding whether the constants of the color correcting circuit are proper or not can be made only when reproducing the data received by the receiver after it had been once transmitted. Therefor, a long time is required and if the apparatus does not have any receiver, the adjustment for color correction can hardly be performed.

Although apparatus to display the result of the correction has already been known, even this apparatus cannot sufficiently indicate the contrast with the correcting agents.

SUMMARY OF THE INVENTION

It is the first object of the present invention to provide an image processing apparatus which can solve the foregoing problems.

To accomplish this object, it is an object of the invention to provide an image processing apparatus in which the user can easily set and change the color correcting (masking) constants.

To accomplish the above object, according to a preferred embodiment of the invention, in a still image transmitting apparatus having means for color separating the original image and performing the color correcting processes, there is provided an image processing apparatus having coefficient setting means for setting various kinds of coefficient values which are used in execution of the color correcting processes and display means for displaying those various kinds of coefficient values, wherein the coefficient values necessary to perform the masking processes are previously displayed on the display means such as CRT or the like and the set values are changed as necessary, thereby enabling the optimum masking constant to be easily set and changed.

Another object of the invention is to provide an image processing apparatus in which the user can easily recognize the set state of the coefficients of the set masking processes.

To accomplish this object, according to a preferred embodiment of the invention, in an image processing apparatus for processing color component signals of an image signal, there is provided an image processing apparatus comprising: memory means for storing each color component signal on a picture plane unit basis; color correcting means for color correcting, on a picture plane unit basis, the signal which was read out of the memory means; designating means for designating a point on the picture plane unit; and means for displaying both of the data before the color correction and the data after the color correction by the color correcting means with respect to the point designated by the designating means, wherein an arbitrary point (or other part) of an image signal memory can be designated and subjected to the color correcting operation, and both of the data before the correction and the result after the correction can be monitored as, e.g., numerical values and colors by the display means.

Still another object of the invention is to provide an image processing apparatus in which the set coefficients of the masking processes can be promptly changed in accordance with the kind of input image signal.

To accomplish the above object, according to a preferred embodiment of the invention, in a still image transmitting apparatus having means for color separating an original image and performing the color correcting processes in accordance with color coefficient values, there is provided an image processing apparatus having: memory means for storing a plurality of color coefficient values corresponding to a plurality of video input sources or output portions; and selecting means for selecting these plurality of video input sources or output portions, wherein each correction coefficient stored in the memory means can be manually or automatically selected in accordance with the means for selecting the inputs or output source.

Still another object of the invention is to provide an image processing apparatus having a novel image processing function.

The above and other objects and features of the present invention will become apparent from the following detailed description and the appended claims with reference to the accompanying drawings.

DETAILED DESCRIPTION OF THE PREFERRED EMBODIMENTS

An embodiment of the present invention will be described in detail hereinbelow with reference to the drawings.

Figure 1:
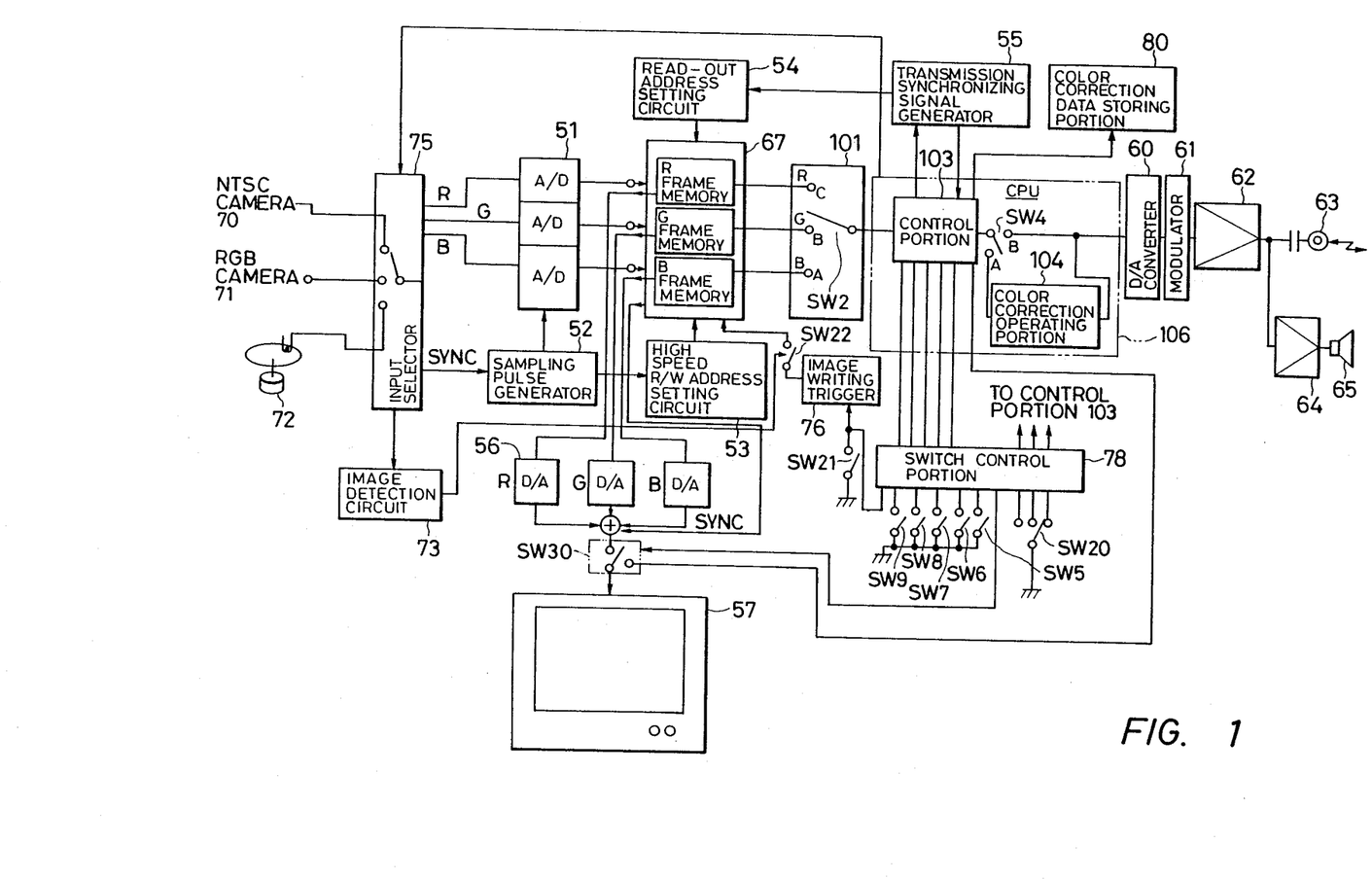
FIG. 1 is a block diagram showing an embodiment of a still image transmitting apparatus to which the present invention is applied.

FIG. 1 is a block diagram showing an embodiment of a still image transmitting apparatus to which the invention is applied. In the diagram, the same parts and components as those shown in FIG. 9 are designated by the same reference numerals. The embodiment of the invention is characterized by an input selector 75, an interface circuit 101, a central processing unit (CPU) 106, and a switch control portion 78.

Numeral 60 denotes the D/A converter; 61 the modulator; 62 the amplifier; 64 an amplifier for a speaker; 65 a speaker; and 75 the input selector for switching the outputs from an NTSC camera 70, an RGB triode camera 71, and a magnetic recording and reproducing apparatus 72 in response to an output of a CPU 106 and for transmitting the selected output to the A/D converting portion 51. Numeral 73 indicates an image detection circuit to detect the presence or absence of the input which was selected by the input selector 75.

Numeral 76 denotes a generating portion to generate a trigger signal to write a video signal into the memory 67.

Numeral 78 denotes the switch control portion. An input selecting switch $SW_{20}$ for allowing the input selector 75 to perform the input selecting operation and switches $SW_5$ to $SW_9$, which will be explained hereinbelow, are connected to the switch control portion 78. $SW_5$ represents the data setting switch; $SW_6$ is the cursor-up switch; $SW_7$ the cursor-down switch; $SW_8$ the coefficient increasing switch; and $SW_9$ the coefficient decreasing switch. A color correction data storing portion 80 stores the masking coefficients corresponding to the respective input sources of the NTSC camera 70, RGB camera 71, and magnetic recording and reproducing apparatus 72. A change-over switch $SW_{30}$ allows the monitor 57 to display either the output of the D/A converter 56 or the color correction coefficient.

The input source selected by the switch $SW_{20}$ is selected by a control portion 103 and the input selector 75 and written into the memory 67 at the timing when the video signal which has been A/D converted by the A/D converting portion 51 turns on a trigger switch $SW_1$.

When it is detected by the image detection circuit 73 that the video signal is not input from the input source selected by the input selector 75, a switch $SW_{22}$ is turned off. Therefore, even when a trigger switch $SW_{21}$ is turned on, the video signal is not written into the memory 67.

The digital image signal of the memory 67 which was supplied to a CPU 106 through the interface circuit 101 is converted into the analog signal by the D/A converter 60 synchronously with a timing pulse which is generated from the transmission sync signal generator 55 when a switch $SW_4$ is connected to the B side (namely, when the color correction is not performed). This analog signal is further amplitude or frequency modulated by the modulator 61 and transmitted to the transmission line 63 through the amplifier 62. This transmission signal is supplied to the speaker 65 through the monitor amplifier 64 and can be output as an audible sound from the speaker 65.

When the switch $SW_4$ is connected to the A side (i.e., in the case of performing the color correction), on the other hand, the video signal is subjected to color correction by a color correction operating portion 104 on the basis of the color correction coefficients (which will be explained in detail hereinafter with reference to FIGS. 2 to 4) which were preset by the switches $SW_5$ to $SW_9$ and thereafter, the color corrected signal is similarly sent to the transmission line 63.

Figure 2:
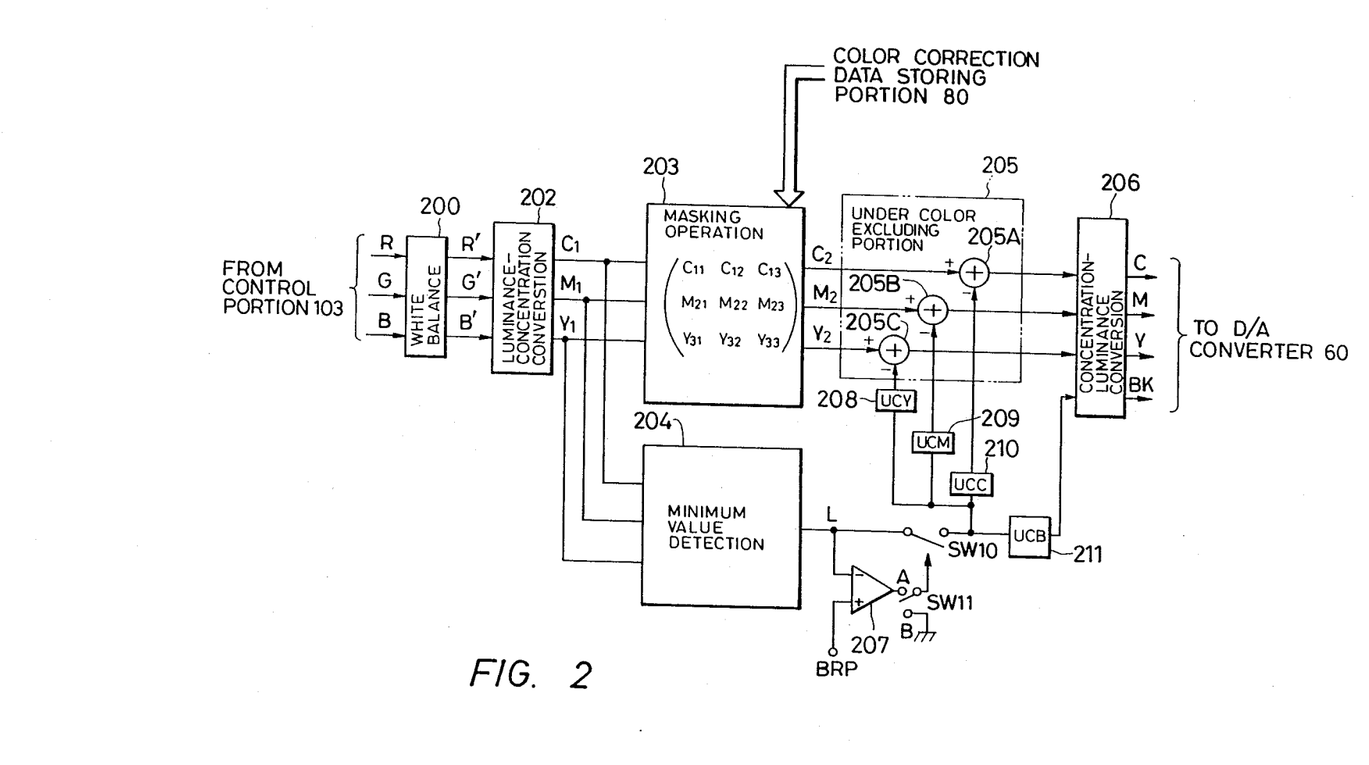
FIG. 2 is a block diagram showing a detailed construction of a color correction operating portion of the apparatus shown in FIG. 1.

FIG. 2 is a block diagram showing a construction of the color correction operating portion 104. In this diagram, a white balance adjusting portion 200 has functions to adjust the pedestal levels of the R, G and B signals input through the control portion 103 (refer to FIG. 1) and to widen the dynamic range.

A luminance-concentration converting portion 202 receives the output signals from the white balance adjusting portion 200 and forms $C_1$, $M_1$ and $Y_1$ signals (concentration signals at the stage before the color correction is performed).

A masking operating portion 203 performs the following correcting operations on the basis of the data stored in the color correction data storing portion 80:

$$\begin{pmatrix} C_2 \\ M_2 \\ Y_2 \end{pmatrix} = \begin{pmatrix} C_{11} & C_{12} & C_{13} \\ M_{21} & M_{22} & M_{23} \\ Y_{31} & Y_{32} & Y_{33} \end{pmatrix} \begin{pmatrix} C_1 \\ M_1 \\ Y_1 \end{pmatrix}$$

A minimum value detecting portion 204 detects the lowest level L among the levels of the $C_1$, $M_1$ and $Y_1$ signals and outputs. The lowest level L is used to form a BK (black) signal necessary to form a black print on the reception side.

An under color excluding portion 205 includes three subtracters 205A to 205C. Numeral 206 denotes a concentration-luminance converting portion and 207 indicates a comparator. Numerals 208 to 211 denote multipliers for multiplying the L signal with a UCY (under color yellow print excluding) coefficient, a UCM (under color magenta print excluding) coefficient, a UCC (under color cyan print excluding) coefficient, and a UCB (under color black print excluding) coefficient, respectively. (Practically speaking, these coefficient values are designated by the control portion 103 in the CPU 106. The procedure to set each coefficient will be explained hereinafter with reference to FIG. 4.)

The under color excluding operations will be executed in the following manner.

The level of the L signal derived from the minimum value detecting portion 204 is compared with a preset BRP (break point) value by the comparator 207. When $L > BRP$, a switch $SW_{10}$ is closed. When $L < BRP$, the switch $SW_{10}$ is opened. In the case of transmitting three colors (cyan print, magenta print, and yellow print), a switch $SW_{11}$ is connected to the B side and the switch $SW_{10}$ is held open. In the case of transmitting four colors (cyan print, magenta print, yellow print and black print), the switch SWII is connected to the A side.

When the switch $SW_{10}$ is closed, the values of $L \times UCC$, $L \times UCM$, and $L \times UCY$ are respectively subtracted from the levels of $C_2$, $M_2$ and $Y_2$ signals calculated in the masking operating portion 203. The concentration signals indicative of the results of the subtraction are sent to the concentration-luminance converting portion 206. In addition, the concentration signal indicative of $L \times UCB$ is also sent to the converting portion 206. Thus, C, M, Y and BK signals are sent to the D/A converter 60.

Figure 3:
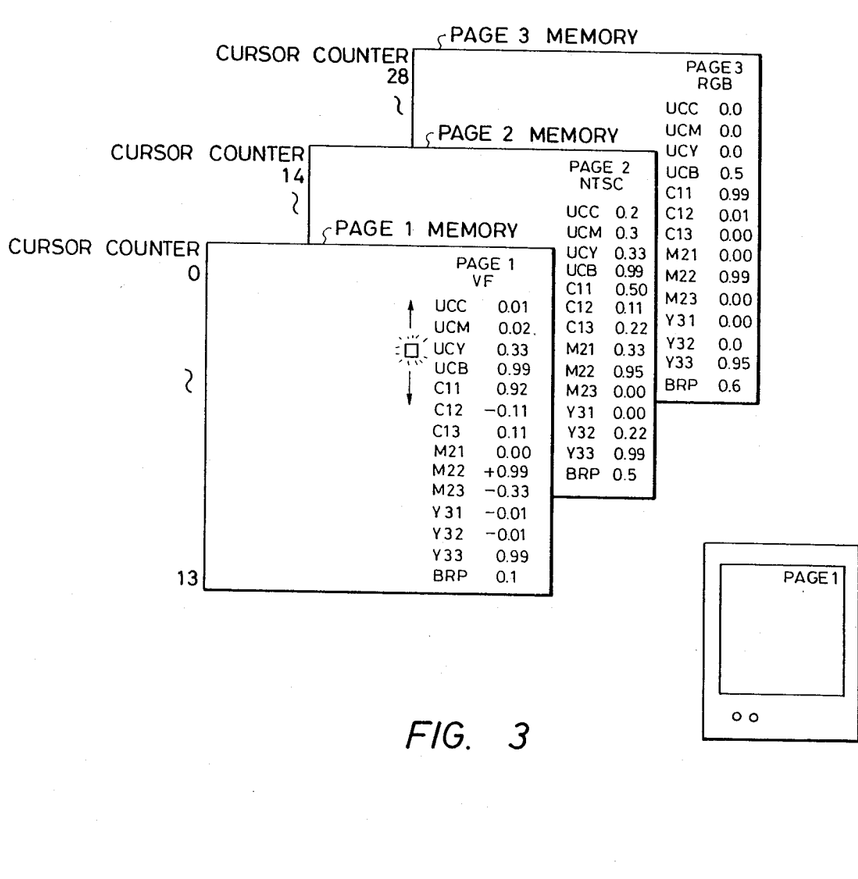
FIG. 3 is a diagram showing an example of monitor display in the embodiment of FIG. 1.
Figure 4:
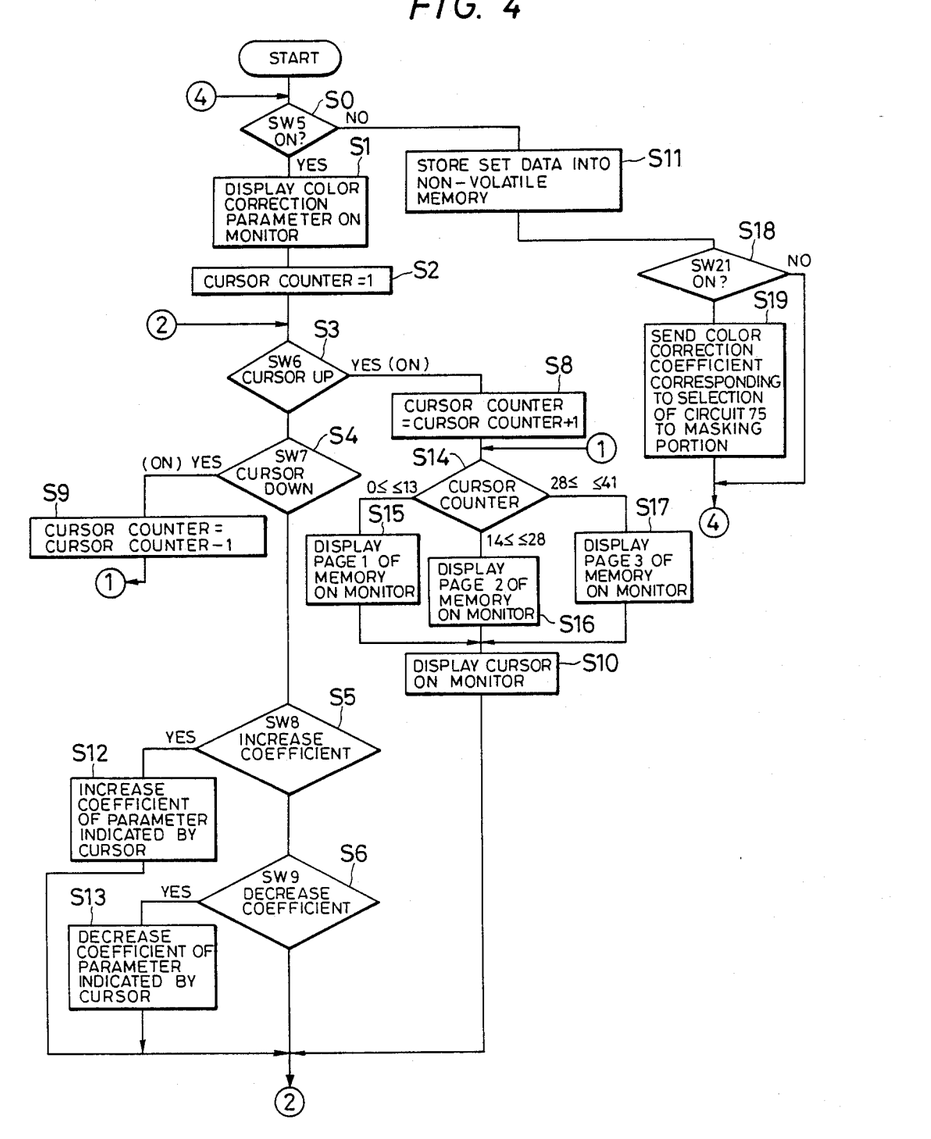
FIG. 4 is a flowchart showing a procedure to set color correction coefficients.

FIG. 3 shows an example in the case where foregoing various kinds of color correction coefficients were displayed on the monitor 57 (refer to FIG. 1). FIG. 4 is a flowchart showing a procedure to set the color correction coefficients shown in FIG. 3.

First, a check is made to see if the data setting switch $SW_5$ has been turned on or off (in step S0). If it has been turned off, the switch $SW_{30}$ is connected to the side of the D/A converter and the video signal is displayed on the monitor. If the switch $SW_5$ has been turned on, the switch $SW_{30}$ is connected to the side of the color correction coefficients and the color correction coefficients are displayed on the monitor screen (steps S1 and S2). Next, the cursor is moved to a desired position by depressing the cursor-up switch $SW_6$ or cursor-down switch $SW_7$ (steps S3→S8→S10, steps S4→S9→S10). In this case, in accordance with the content of the cursor counter which is updated by moving the cursor, the content which is displayed on the monitor screen is changed as shown in FIG. 3: namely, when the count value of the cursor counter lies within a range of 0 to 13, PAGE 1 (color correction coefficients corresponding to the magnetic recording and reproducing apparatus VF) are displayed; when the count value falls within a range of 14 to 27, PAGE 2 (color correction coefficients corresponding to the NTSC camera) are displayed; and when the count value lies within a range of 28 to 41, PAGE 3 (color correction coefficients corresponding to the RGB camera) are displayed (steps S15 and S16). The data of those PAGEs 1 to 3 is stored in the color correction data storing portion 80. After the cursor is moved to a desired position, the coefficient increasing switch $SW_8$ or coefficient decreasing switch $SW_9$ is depressed thereby to change the coefficient values to desired coefficient values (steps S5→S12, steps S6→S13).

Next, the data setting switch $SW_5$ is turned off to instruct the CPU 106 to change the set color correction coefficients (steps S0→S11).

Thus, the coefficient setting data transmitted to the CPU 106 is stored in the color correction data storing portion 80 (constituted by, e.g., an EEPROM) whose power source is backed up by a battery. Therefore, this data is not extinguished even when the power source is shut off. Since the switch $SW_{30}$ is also connected to the side of the D/A converter 56, the video signal from the memory 67 is reproduced and displayed on the monitor screen.

Any one of the color correction coefficients which have been set as described above is selected and used in the following manner. Namely, when it is detected that the trigger pulse for allowing the video signal to be written into the frame memory by the switch $SW_{21}$ has been supplied to the frame memory 67 from the image writing trigger generating portion 76 (step S18), the color correction coefficient corresponding to the input source selected is used and the operation is performed (step S19). As mentioned above, the color corrected signal is converted into the analog signal by the D/A converter 60 and modulated by the amplitude or frequency modulator 61. The modulated signal is amplified by the amplifier 62 to the signal level which is suitable for the transmission line. The DC components of this signal are eliminated and thereafter, the amplified signal is sent to the transmission line 63. The trigger pulse is used to write the input video signal into the frame memory by the switch $SW_{21}$. The presence or absence of the video signal is detected by the image detection circuit 73. If the absence of the video signal is detected, the switch $SW_{22}$ is opened, so that the trigger pulse is not sent to the frame memory. Namely, the rewriting operation of data in the frame memory is inhibited. At this time, the selected color correction coefficient is held unchanged.

As described above, according to this embodiment, since the color correction coefficients corresponding to a plurality of video input sources can be set, there is no need to change the color correction coefficients every time image data is transmitted with respect to video input sources having different characteristics. Therefore, this embodiment is very effective since the proper color correction coefficients can be promptly set and the burden of the user can be reduced. On the other hand, when the video data is stored in the image memory, by automatically switching the color correction coefficients corresponding to the video data stored, the switch to select the color correction coefficients can be omitted.

In this embodiment, the case where the video input sources consist of three input sources of the NTSC camera, RGB camera, and magnetic recording and reproducing apparatus has been shown and described. However, even in a case of three or more input sources, by previously preparing the color correction coefficients corresponding to these input sources in the coefficient setting mode, the invention can be also similarly embodied.

On the other hand, if a plurality of video output portions, e.g., printers are provided as well as the video input sources and it is necessary to perform the different color corrections to these printers, the invention shown in the foregoing embodiment can be applied by previously storing the color correction coefficients corresponding to the output portions into the memory means.

Figure 5:
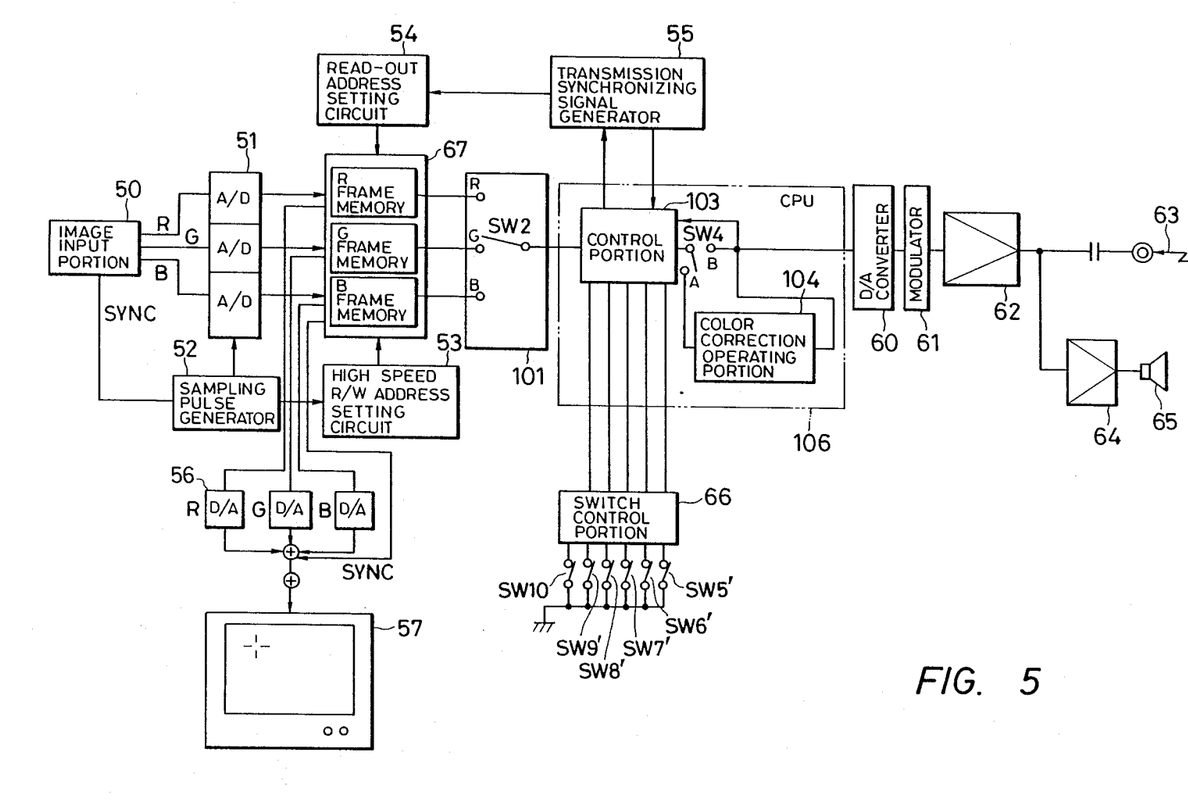
FIG. 5 is a block diagram showing a construction of another embodiment different from that of FIG. 1.
Figure 6:
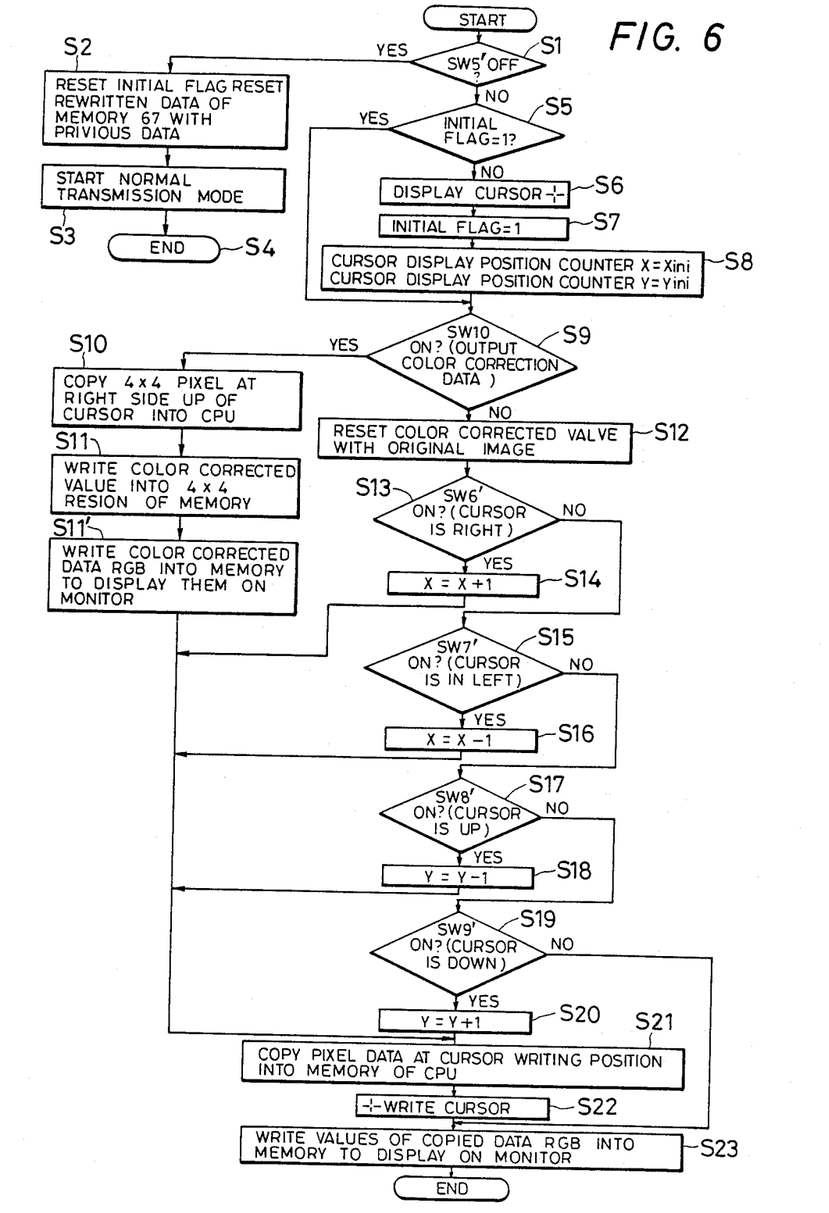
FIG. 6 is a control flowchart for color correction of one part according to the embodiment shown in FIG. 5.
Figure 7:
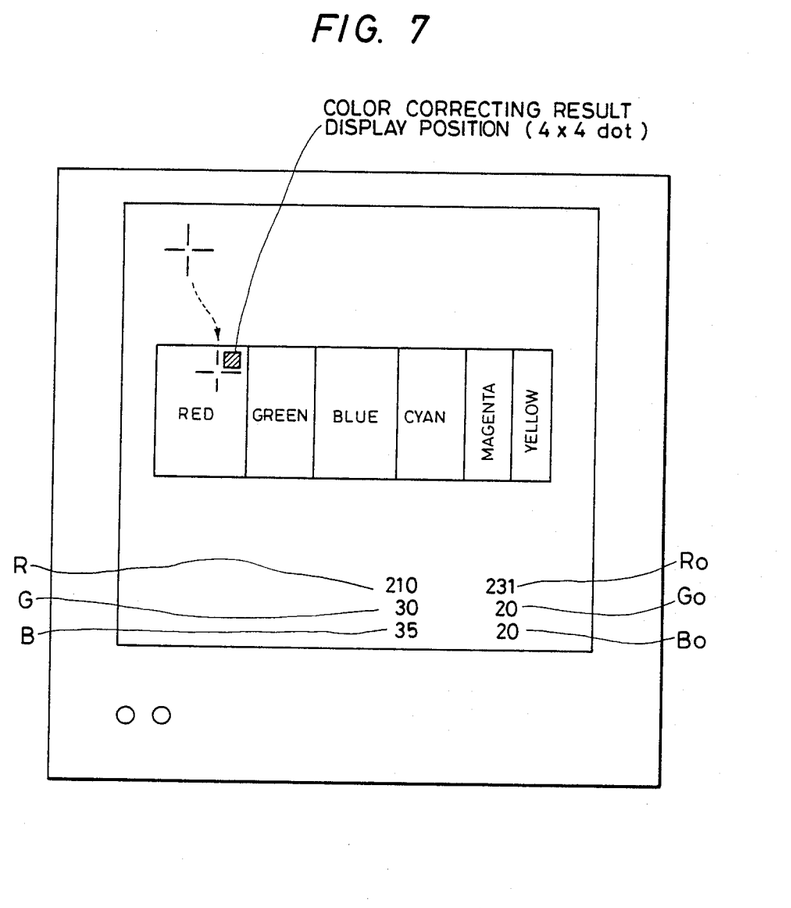
FIG. 7 is a diagram showing a monitor display screen in an embodiment according to the invention.

With reference to FIGS. 5 to 7, an explanation will now be made with respect to another embodiment in which when the image data stored in the frame memory 67 is color corrected, both of the data before the color correction and the data after the color correction can be preferably displayed.

FIG. 5 is a block diagram showing a construction of such an embodiment. In FIG. 5, the parts and components having the same functions as those shown in FIG. 1 are designated by the same reference numerals and their descriptions are omitted.

In such an embodiment, there is shown an image processing apparatus having the one-point transmission mode which is constituted in such a manner that a signal indicative of the cursor which was generated in the control portion 103 and the numerical value indicative of the data of the position which is indicated by the cursor can be displayed on the monitor 57 and the values which were color corrected by the color correction operating portion 104 can be further displayed on the monitor 57.

In FIG. 5, $SW_5'$ denotes a setting switch to set the one-point transmission mode; $SW_6'$ to $SW_9'$ are switches to upwardly, and move the cursor which is displayed on the monitor screen to the right, to the left, up and down, respectively; and $SW_{10}$ is the color correction data output switch to display the color corrected data on the monitor 57.

Although not shown in FIG. 5, all of the parts and components shown in FIG. 1 can be also obviously provided in FIG. 5.

The operation of this embodiment will now be schematically explained.

In the embodiment shown in FIG. 5, one point or other part in the image memory where the color correcting operation is to be performed is designated by the cursor of the mark. The central point of the cursor is subjected to the color correcting operation. The result of the color correcting operation is displayed as a numerical value on the monitor screen. The corrected color is also simultaneously displayed on the right side of the cursor by rewriting the value in the image memory.

The above operations will be explained with reference to a flowchart shown in FIG. 6 and an example of display on the monitor screen shown in FIG. 7.

First, if it is determined that the switch $SW_5'$ to make operative or inoperative the one-point transmission mode has been turned off, the processing routine advances from step S1 to step S2 to reset an initial flag, which will be explained hereinafter. Further, if the content of the memory 67 has been rewritten in steps S11' and S23, which will be explained hereinafter, the image data is returned to the data stored in the control portion 103 and the processes in the normal transmission mode are executed in step S3 and the processing routine is finished in step S4.

On the contrary, if the switch SW$_5$' has been turned on and the processes in the one-point transmission mode are executed, a check is first made in step S5 to see if the initial flag has been set or not. If it is not set, the cursor " + " is displayed on the monitor screen in step S6. The initial flag is set in step S7. In the next step S8, the display position of the cursor is initialized using the cursor display position counters X and Y as initial positions X$_{ini}$ and Y$_{ini}$.

If the initial flag has been set, step S9 follows and a check is made to see if the color correction data switch SW$_{10}$ has been turned on or not. If it has been turned on, step S10 follows and the control portion 103 sends a signal to the read-out address setting circuit 54 through the transmission sync signal generator 55 so as to read out the pixel of 4×4 dots on the right upper side of the cursor and this pixel is stored into the memory in the control portion 103. Further, in step S11, the result of the color correcting operation performed in the color correction operating portion 104 is written through the interface circuit 101 into the memory at the position of 4×4 dots. In the next step S11', the color corrected values of R, G and B are stored into the memory 67 in order to display them as shown in FIG. 7.

If the color correction data switch SW$_{10}$ has been turned off, step S12 follows and the color corrected value in step S11 is rewritten into the original signal which has preliminarily been stored in the control portion 103 in step S10. If the color corrected data does not exist, no process is performed in step S12.

In the next steps S13 and S14, steps S15 and S16, steps S17 and S18, and steps S19 and S20, the switching states of the switches SW$_6$', SW$_7$', SW$_8$' and SW$_9$' are detected and the values of the cursor display position counters X and Y are updated.

After the values of the counters are updated, the data of the pixel at the point at which the cursor is written, i.e., of the values of the cursor display position counters X and Y is written into the memory in the control portion 103 in step S21. In step S22, the cursor display position is written into the address corresponding to the values of the counters X and Y in the frame memory. In the next step S23, the data of R, G and B at the point at which the cursor is written is written into the memory 67 in order to display as shown in FIG. 7.

The operation under the foregoing control will now be briefly explained hereinbelow.

When the switch SW$_5$ to make the one-point transmission mode operative or inoperative is turned on, the cursor of the mark " + " is output to the frame memory. The cursor is to one point of the image which should be subjected to the color correcting operations by use of the cursor moving switches SW$_6$' to SW$_9$'. After the cursor is moved, the color correction data output switch SW$_{10}$ is turned on. As shown in FIG. 7, the values in the central portion of the cursor are subjected to the color correcting operations by the color correction operating portion of FIG. 2. The values of the pixel of 4 dots in the vertical direction × 4 dots in the horizontal direction in the memory in the right upper portion of the cursor are copied into the memory of the CPU 106. The results of the operations are written therein. The numerical values are also displayed in the right lower portion of the screen.

The color correction data output switch SW$_{10}$ is turned off and the image data stored in the memory of the CPU 106 is returned. The cursor is moved to the position to check the next color correction. At this time, the color corrected values for the central portion of the cursor are converted into the analog signals by the D/A converter 60 and can be confirmed as an audible sound through the monitor speaker 65.

The cursor indicative of the color correcting position is moved so as to form a pattern by ordinarily writing such values as to obtain the highest luminance into the memory 67 through the interface circuit 101. However, there is a case where, when the cursor has been moved to a high luminance position, it is difficult to see the cursor of the mark " + " because it cannot be discriminated from the background color. Therefore, to prevent such a situation, the following method is used. Namely, assuming that the memory values at the point locating at the center of the cursor are R$_1$, G$_1$ and B$_1$, the luminance value Y of the cursor becomes as follows:

$$Y = 128 + (R_1 + G_1 + B_1)/3$$

where $(R_1 + G_1 + B_1)/3 < 128$ or
$Y = (R_1 + G_1 + B_1)/3 - 128$ where, $(R_1 + G_1 + B_1)/3 \geq 128$. By writing the cursor using this luminance value Y, it is prevented that the cursor is hard to see because it is mixed with the background color.

The following effects are obtained according to the foregoing embodiments.

(1) Since the color correction coefficients corresponding to a plurality of video input sources or output portions are preliminarily stored in the memory means, there is no need to reset the color correction coefficients from the beginning every time the video input sources are switched to different input sources.

(2) Since the color correction coefficients can be displayed on the monitor and properly changed, the color correction coefficients can be confirmed as necessary. Further, the color correction suitable for a processing ink or the like on the reception side can be performed without increasing the memory capacity.

(3) Since both the data before the color correction and the color corrected data can be reproduced by, e.g., the monitor although it relates to an arbitrary point, the color correction state can be observed and confirmed by the eyes of the user himself. There is no need to reproduce the color corrected data by the receiver after it has once been transmitted. It is possible to easily discriminate whether the color corrected coefficients of the image to be transmitted are correct or not.

What I claim is:

1. An image processing apparatus for correcting an image, comprising:
   (a) means for generating a plurality of coefficient values which are used when color correction is performed;
   (b) coefficient setting means for setting the plurality of coefficient values;
   (c) control means for allowing the coefficient values set by said coefficient setting means to be displayed on a monitor;
   (d) supply means for supplying image data corresponding to said image to the monitor, so as to reproduce the image data as a visible image; and (e) inhibit means for inhibiting reproduction of the image data by the monitor when said control means operates.

2. An image processing apparatus according to claim 1, further comprising:
(f) a monitor for displaying said coefficient values.

3. An image processing apparatus according to claim 1, further comprising:
(f) a memory to store a plurality of color components of an input image; and
(g) means for correcting the color components stored in said memory in accordance with the coefficient values set by said coefficient setting means.

4. An image processing apparatus according to claim 1, wherein said coefficient setting means comprises first setting means for setting kinds of the coefficient values and second setting means for instructing that the coefficient values of the kinds which were set by said first setting means be changed.

5. An image processing apparatus for correcting an image, comprising:
(a) means for generating a plurality of coefficient values which are used when color correction is performed;
(b) coefficient setting means for setting the plurality of coefficient values;
(c) control means for allowing the coefficient values set by said coefficient setting means to be displayed on a monitor;
(d) supply means for supplying image data corresponding to said image to the monitor, so as to reproduce the image data as a visible image;
(e) inhibit means for inhibiting reproduction of the image data by the monitor when said control means operates;
(f) a memory to store a plurality of color components of an input image; and
(g) means for correcting the color components stores in said memory in accordance with the coefficient values set by said coefficient setting means,
wherein, when said respective color components stored in said memory are respectively $C_1$, $M_1$, and $Y_1$, said means for performing the color correction is means for performing the following arithmetic operation:

$$\begin{vmatrix} C_2 \\ M_2 \\ Y_2 \end{vmatrix} = \begin{vmatrix} C_{11} & C_{12} & C_{13} \\ M_{21} & M_{22} & M_{23} \\ Y_{31} & Y_{32} & Y_{33} \end{vmatrix} \begin{vmatrix} C_1 \\ M_1 \\ Y_1 \end{vmatrix}$$

wherein the coefficient values are $C_{11}$ to $C_{13}$, $M_{11}$ to $M_{23}$, and $Y_{31}$ to $Y_{33}$.

6. An image processing apparatus comprising:
(a) a memory to store an input image;
(b) means for setting a plurality of coefficient values which are used to color correct the image stored in said memory, said setting means including first setting means for setting kinds of the coefficient values and second setting means for instructing that the coefficient values of the kinds which were set by said first setting means be changed;
(c) control means for allowing the coefficient values set by said setting means to be displayed on a monitor;
(d) supply means for supplying image data corresponding to said image to the monitor, so as to reproduce the image data as a visible image; and
(e) inhibit means for inhibiting reproductions of the image data by the monitor when said control means operates.

7. An image processing apparatus according to claim 6, further comprising:
(f) means for color correcting the image stored in said memory in accordance with said coefficient values.

8. An image processing apparatus according to claim 6, wherein s aid control means is means for supplying a pattern corresponding to the coefficient values which were set by said setting means to the monitor in place of the image stored in the memory.

9. An image processing apparatus according to claim 6, further comprising the monitor.

10. An image processing apparatus according to claim 6, wherein said memory is a memory for storing every color component of an input image.

11. An image processing apparatus comprising:
(a) a memory to store input image data;
(b) correcting means for color correcting said image data stored in said memory; and
(c) supplying means for simultaneously supplying to a monitor the image data before it is corrected by said correcting means and image data after it has been corrected by the correcting means.

12. An image processing apparatus according to claim 11, wherein said supplying means includes:
(i) indicating means for indicating predetermined data in said image data stored in said memory;
(ii) means for outputting the data indicated by said indicating means to said correcting means; and
(iii) means for converting both the data indicated by said indicating means and the data which has been color corrected by said correcting means into numerical value pattern signals and supplying the numerical value pattern signals to said monitor.

13. An image processing apparatus according to claim 12, wherein said memory is a memory to store the image of one picture plane and said indicating means is means for indicating the data at a predetermined position in said picture plane.

14. An image processing apparatus according to claim 13, wherein said supplying means further includes:
(iv) means for supplying a pattern signal indicative of the redetermined position indicated by said indicating means to the monitor.

15. An image processing apparatus according to claim 11, further comprising the monitor.

16. An image processing apparatus comprising:
(a) memory means for storing a plurality of color component signals on a picture plane unit basis;
(b) color correcting means for color correcting a signal read out of said memory means on a picture plane unit basis;
(c) designating means for designating a part of said picture plane unit; and
(d) means for displaying data before the color correction and the data after it is color corrected by said color correcting means with respect to the part designated by said designating means.

17. An image processing apparatus according to claim 16, wherein said displaying means is means for displaying on a monitor screen a position of the part designated by said designating means.

18. An image processing apparatus according to claim 16, wherein said memory means stores said color components signals into different memory areas, respectively.

* * * * *

UNITED STATES PATENT AND TRADEMARK OFFICE
CERTIFICATE OF CORRECTION

PATENT NO. : 4,864,391

DATED : September 5, 1989

INVENTOR(S) : TOMISHIGE TAGUCHI

It is certified that error appears in the above-identified patent and that said Letters Patent is hereby corrected as shown below:

COLUMN 1

Line 33, "color filters so" should read --color filters 50--.

COLUMN 3

Line 11, "Therefor," should read --Therefore,--.

COLUMN 4

Line 14, "source." should read --sources.--.

COLUMN 6

Line 37, "switch SWII" should read --switch $SW_{11}$--.

COLUMN 8

Line 40, "upwardly, and" should be deleted.

COLUMN 9

Line 50, "is written" (second occurrence) should be deleted.

Line 57, "is" should read --is moved--.

COLUMN 10

Line 21, "locating" should read --located--.

Line 27, "$(R_1+G_1+B_1)/3 \geq 128$. By" should read --"$(R_1+G_1+B_1)/3 \geq 128$. ¶ By--.

UNITED STATES PATENT AND TRADEMARK OFFICE
CERTIFICATE OF CORRECTION

PATENT NO. : 4,864,391

DATED : September 5, 1989

INVENTOR(S) : TOMISHIGE TAGUCHI

Page 2 of 2

It is certified that error appears in the above-identified patent and that said Letters Patent is hereby corrected as shown below:

COLUMN 11

Line 37, "stores" should read --stored--.
Line 52, "$M_{11}$" should read --$M_{21}$--.

COLUMN 12

Line 1, "reproductions" should read --reproduction--.
Line 8, "s aid" should read --said--.
Line 44, "redetermined" should read --predetermined--.
Line 66, "into" should read --in--.

Signed and Sealed this

Twenty-ninth Day of October, 1991

Attest:

HARRY F. MANBECK, JR.

Attesting Officer

Commissioner of Patents and Trademarks